3,305,514
VINYL HALIDE RESIN, EPOXY OR ALKYD RESIN, MONOALKENYL AND POLYALKENYL MONOMER REINFORCED THERMOPLASTIC COMPOSITION

Arthur J. Tiffan, Northfield, and Raymond S. Shank, Bedford, Ohio, assignors to The Standard Oil Company, Cleveland, Ohio, a corporation of Ohio
No Drawing. Filed Feb. 6, 1964, Ser. No. 343,146
16 Claims. (Cl. 260—32.6)

This invention relates to reinforced plastic compositions and in particular to reinforced intermediate thermoplastic materials which can be formed readily into structures which are moldable and convertible with heat to rigid, thermoset structures having unexpectedly good physical and chemical properties. This invention is an unobvious and unexpected improvement over that disclosed and claimed in the copending U.S. patent application of Arthur J. Tiffan, Serial No. 267,813, filed March 25, 1963.

It is known in the art to use a thermosetting liquid plasticizer with a thermoplastic resin to form liquid compositions which can be cast or coated upon surfaces and subsequently cured or vulcanized as disclosed in U.S. Patents Nos. 2,155,590; 2,155,591; Canadian Patent No. 640,850 and British Patent 905,711. The replacement of part of the conventional plasticizer with a polymerizable plasticizer in a plastisol formulation is disclosed in U.S. Patents Nos. 2,539,207 and 2,567,719. The latter patent also discloses the inclusion of a thermosetting resin in the plastisol formulation. It is also known to reinforce heat-curable thermoplastic materials by the inclusion of fibers therein as disclosed in U.S. Patents Nos. 2,815,309 and 2,912,418, as well as in British Patent No. 906,475.

It is well known that thermosetting resins have many desirable properties but are relatively difficult to fabricate and that thermoplastic materials are more easily fabricated but they lack much in end-product performance. It would be highly desirable to obtain a composition and process which combined the ease of fabrication of thermoplastics with the high performance of thermosetting plastics in the end product.

It is, therefore, an object of the present invention to provide a novel thermoplastic composition which has excellent shelf life and can be handled in a conventional manner and ultimately can be converted rapidly to a thermoset article in conventional molding and forming equipment normally used in the handling of thermoplastic resins. Another object is the provision of a thermoplastic structure which can be molded, drawn and cured rapidly to produce a reinforced thermoset structure. It is also an object to provide rigid reinforced thermoset articles of many shapes and sizes which have unexpectedly good physical and chemical properties by relatively simple procedures. That the foregoing and other objects have been accomplished will become evident to those skilled in the art from the following description and illustrative examples.

The essence of this invention lies in thermoplastic mixes, their preparation and availability to fabricators in an intermediate, uncured form and finally a forming operation in which the thermoset reaction also occurs in an improved rapid manner to produce the formed thermoset and optionally reinforced end product.

The thermoplastic compositions of this invention which can be handled in a conventional manner and are convertible to reinforced thermoset articles in conventional thermoplastic handling equipment may be composed of five elements; namely, (A) a thermoplastic resin, (B) a thermosetting synthetic polymer, (C) a polymerizable polyalkenyl monomer, (D) a polymerizable monoalkenyl monomer of low volatility, and (E) a randomly dispersed reinforcing fiber. In addition to the aforementioned elements, it is also often desirable to include small amounts of one or more modifying agents including heat or light stabilizers, polymerization catalysts, polymerization inhibitors, anti-oxidants, coloring agents, flame-proofing substances such as antimony oxide and certain phosphorous compounds, pigments, fillers such as clay, talc, calcium carbonate, calcium silicate, hollow glass or plastic microspheres such as those described in U.S. Patents Nos. 2,797,201 and 2,978,339 and the like.

The uncured compositions of this invention are useful in and their scrap is reusable in such well-known plastics operations as injection molding, compression molding, drawing, calendering, blowing, vacuum forming and extrusion as well as others. The most preferred uncured and cured compositions of this invention are not combustible; that is, they are self-extinguishing and do not support a flame.

It is preferred that there be present in the thermoplastic compositions of this invention from about 7 to 70 parts by weight of component (A) and from about 93 to 30 parts by weight of components (B), (C) and (D) per 100 parts of the sum of $(A)+(B)+(C)+(D)$ (total resinous material). Furthermore, it is preferred that there be present from about 0 to 80 parts by weight of component (B), from about 0 to 80 parts by weight of component (C) and from 10 to 100 parts of component (D) per 100 parts of the sum of $(B)+(C)+(D)$. It is also preferred that there be present in the thermoplastic composition of the present invention from about 0 to 50 parts by weight of component (E) per 100 parts by weight of the sum of $(A)+(B)+(C)+(D)+(E)$. It is apparent that compositions containing no component (E) are not reinforced.

The most preferred compositions of this invention are reinforced and contain from 40 to 60 parts by weight of component (A) and from 60 to 40 parts by weight of components (B), (C) and (D) per 100 parts by weight of the sum of $(A)+(B)+(C)+(D)$ (total resinous material). Furthermore, it is most preferred that there be present from 30 to 70 parts by weight of component (B), from 0 to 40 parts by weight of component (C) and from 10 to 70 parts by weight of component (D) per 100 parts by weight of the sum of $(B)+(C)+(D)$. It is also most preferred that there be present in the thermoplastic composition embodied herein from about 20 to 50 parts by weight of component (E) per 100 parts by weight of the sum of $(A)+(B)+(C)+(D)+(E)$.

Component (A) of the present invention may be one or more of the well-known thermoplastic vinyl halide polymers, such as polyvinyl chloride, polyvinyl fluoride, polyvinyl bromide, and the like. Copolymers and interpolymers of vinyl halide monomers of the foregoing types are also included herein. For instance, there may be utilized in place of the homopolymers of vinyl chloride, multi-component copolymers or interpolymers made from monomeric mixtures containing vinyl chloride together with a lesser amount of copolymerizable olefinic material. Monomeric olefinic materials which may be interpolymerized with vinyl chloride include other vinyl halides, vinylidene bromide; vinyl esters, such as vinyl acetate, vinyl propionate, vinyl butyrate, vinyl chloroacetate, vinyl chloropropionate, vinyl benzoate, vinyl chlorobenzoate, and others; acrylic and alpha-alkyl acrylic acids, their alkyl esters, their amides and their nitriles, such as acrylic acid, chloroacrylic acid, methacrylic acid, ethacrylic acid, methyl acrylate, ethyl acrylate, butyl acrylate, n-octyl acrylate, 2-ethyl hexyl acrylate, n-decyl acrylate, methyl methacrylate, butyl methacrylate, methyl ethacrylate, ethyl ethacrylate, acrylamide, n-methyl acrylamide, N,N-dimethyl acrylamide, acrylonitrile, chloroacrylonitrile, methacrylonitrile, ethacrylonitrile, and others; vinyl aromatic compounds, such as styrene, alphamethyl styrene, dichlorostyrene, vinyl naphthalene, and others; alkyl esters of maleic and fumaric acids, such as dimethyl maleate, diethyl maleate, and others; vinyl alkyl esters and ketones, such as vinyl methyl ether, vinyl ethyl ether, vinyl isobutyl ether, 2-chloroethyl vinyl ether; vinyl ketones such as methyl vinyl ketone, ethyl vinyl ketone, isobutyl vinyl ketone, methyl isopropenyl ketone, and others; and in addition other monoolefinic materials, such as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=C<$ group.

The preferred thermoplastic vinyl halide resins in the present invention are the polyvinyl chloride resins including the homopolymers and copolymers of vinyl chloride and up ot about 50% of at least one other monovinyl monomer copolymerizable with vinyl chloride. Vinyl chloride must constitute at least 50% by weight of the total monomer mixture used in the preparation of the vinyl chloride interpolymers useful herein. For instance, there may be used copolymers of 50 to 99%, or more preferably 70 to 99% by weight of vinyl chloride together with 1 to 50%, or more preferably 1 to 30% by weight of vinylidene chloride, a vinyl ester, or an acrylic or methacrylic ester or any of the other mono-olefinic materials mentioned above, or any two or more of these.

The thermoplastic vinyl halide resins embodied herein may be produced by any method known to the art, such as by polymerization in solution, in mass or in aqueous medium. The preferred method of polymerization is in aqueous medium.

As was mentioned earlier, various modifying agents may be added to the compositions of this invention. Thus materials may be added to stabilize the polyvinyl chloride or vinyl halide copolymers against decomposition by heat, such as aluminum, barium and cadmium soaps, calcium oleate, calcium stearate, calcium ricinoleate, lead carbonate, tin tetraphenyl, tin tetraethyl, lead silicate, epoxidized vegetable oils, disodium hydrogen phosphate, etc. Any of the many well known stabilizers for vinyl halide resins may be used without departing from the scope of this invention, the amount of stabilizer depending on the particular formulation employed. It has been found that from about 0.1 to 20% by weight of stabilizer based on the weight of the vinyl halide copolymer or polyvinyl chloride may be used advantageously.

The component (B) of the present invention is a thermosetting synthetic polymer and preferably may be either an epoxide resin or an unsaturated, polymerizable alkyd resin.

The alkyd resins useful herein result from the reaction of polyhydric alcohols and resinifying carboxylic organic acids, such as polybasic acids and their anhydrides. The alkyd resins useful herein are often subdivided into (1) phthalic alkyd resins, (2) maleic alkyd resins and (3) other alkyd resins.

The preferred polyesters or alkyd resins in the present invention are those containing sufficient olefinic unsaturation so as to be thermosetting and this olefinic unsaturation should be present in the polyesters in the form of unsaturated dibasic acid moieties. The other portions of the preferred polyester molecules may be composed of saturated dibasic acid, aliphatic polyhydric alcohol and aromatic polyhydric alcohol moieties. Illustrative unsaturated dibasic acids and anhydrides, saturated dibasic acids and anhydrides, aliphatic polyhyric alcohols and aromatic polyhydric alcohols useful in the preparation of the preferred polyesters of the present invention include the following:

UNSATURATED DIBASIC ACIDS AND ANHYDRIDES

Maleic acid
Chloromaleic acid
Ethyl maleic acid
Maleic anhydride
Citraconic anhydride
Muconic acid
Fumaric acid
Aconitic acid
Mesaconic acid
Itaconic acid
Tetrahydro phthalic acid

SATURATED DIBASIC ACIDS AND ANHYRIDES

Adipic acid
Azelaic acid
Sebacic acid
Dodecyl succinic acid
Succinic acid
Tetrachlorophthalic anhydride
Phthalic anhydride
Phthalic acid
Isophthalic acid
Hexahydrophthalic anhydride
Malic acid
Citric acid

ALIPHATIC POLYHYDRIC ALCOHOLS

Ethylene glycol
Propylene glycol
Trimethylene glycol
Triethylene glycol
Pentaethylene glycol
Polyethylene glycol
1,4-butanediol
Diethylene glycol
Dipropylene glycol
2,2-dimethyl-1,3-propanediol
Hexamethylene glycol
1,4-cyclohexane dimethanol

AROMATIC POLYHYDRIC ALCOHOLS

Xylene alcohols
Ethyl resorcinol
Propyl resorcinol
2,4-dimethyl resorcinol
3,6-dimethyl-1,2,4-benzenetriol
Ethyl pyrogallol
2,4-methyl-1,4-dihydroxy naphthalene
3-methyl-1,4,5-naphthalene triol
Dimethylol toluene
Dimethylol xylene
Bis-hydroxy ethyl or bis-hydroxy propyl ethers of resorcinol, catechol, hydroquinones
1,5-dihydroxynaphthalene
4,4'-isopropylidene-bis-phenol, etc.

The so-called epoxy resins or ethoxylene resins are those compounds having an ether oxygen atom joined to two vicinal carbon atoms. The term "epoxide resin" denotes the resinous reaction product of certain of these epoxide compounds and compounds having available hydrogen atoms linked to carbon atoms by oxygen atoms as, for instance, polyhydric phenols and polyhydric alcohols. Epoxy resins useful herein include liquid as well as solid material of this class. The liquid resins are generally of lower and the solid resins are of higher relative molecular weight. A particularly useful epoxide resin is the reaction product of an epihalohydrin and a polyhydric phenol, as exemplified by bisphenol epichlorohydrin. Other suitable epoxide resins include the reaction product of epihalohydrins and a polyhydric alcohol, such as ethylene glycol, propylene glycol, trimethylene glycol, and the like. Other equivalent epoxide resins are well known to those skilled in the plastics art.

The epoxy resins embodied in the present invention are polymeric materials having terminal epoxy groups. Epoxy resins are thermosetting materials which may be converted into durable, cross-linked polymers. The hardening or curing reaction may involve a variety of chemical reactions in which the epoxy groups take part. Modifying resins, coupling agents or catalysts are required to effect the final polymerization and cross-linking.

In general, epoxy resins containing aromatic groups (from phenols) when cured appear to offer somewhat higher strength and chemical resistance properties than those based on aliphatic polyols. The commercial types of epoxy resins are based principally on bisphenol-A, which is the common name for 2,2-bis (p-hydroxyphenyl) propane, $(CH_3)_2—C(C_6H_4OH)_2$, a condensation product of acetone and phenol. Bisphenol-F, the acid condensation product of 2 moles of phenol and 1 mole of formaldehyde, $CH_2CH(C_6H_4OH)_2$ is also used in the production of epoxy resins. The commercial epoxy resins (approximate molecular weight range of 400–8000) vary in appearance from viscous liquids to clear, brittle solids melting up to 155° C. Their chemical structure (illustrated by a bisphenol-A resin) is postulated to be as follows:

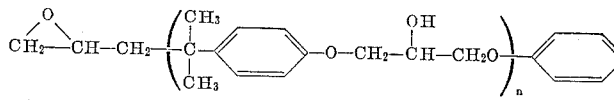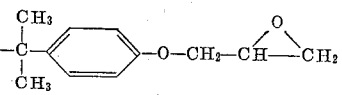

wherein $n$ is an integer.

In epoxy resins based on polyols other than bisphenol-A the structure would correspond to that shown above with the polyol moiety replacing the bisphenol-A portions shown.

By varying the operating conditions and the preparations of epichlorohydrin and bisphenol-A used in the manufacture, resins of low, intermediate, or higher molecular weight ranges may be produced. It is the combination of the hydroxyl and epoxy groups in the resin with polyfunctional reagents, such as polyamines, anhydrides, and phenolic and urea resins that makes possible the cured resins. In general, the low molecular weight, liquid epoxy resins of high epoxy content are prepared in the present invention.

A large number of chemical reagents will convert epoxy resins into hard, infusible, cross-linked polymers. In the hardening process both the epoxy and the hydroxyl group may be involved, and curing can be made to take place at either room temperature or upon heating. In the instant invention, it is proposed, and indeed is necessary, that the curing does not take place at room temperature or even at slightly elevated temperatures. Curing may take place by catalytic polymerization or by coupling processes. In addition, epoxy resins may be considered as resinous polyols; they can be converted into epoxy resin esters by esterification with monobasic organic acids. The esters obtained resemble alkyd resins in properties and can be cured by air-drying or baking.

The coupling process at present is the most desirable method for curing epoxy resins. Reagents used in the coupling process include primary diamines and polyamines containing more than two amino hydrogens available for reaction with the epoxy groups present in the resin, polysulfides containing at least two —SH groups, anhydrides of carboxylic acids and more preferably the anhydrides of dibasic carboxylic acids, co-reacting resins such as amino resins or phenolic resins and others containing a plurality of alkylol groups available for interaction with the hydroxyl group of the epoxy resin.

In the coupling process, stoichiometric or near stoichiometric amounts of the coupling agent are used. In the amine-epoxy resin reaction, for instance, sufficient amine should be present to give completely cross-linked polymer by utilizing all amine hydrogens. To illustrate, if optimum properties are desired with metaphenylene diamine, $C_6H_4(NH_2)_2$, as the curing agent, it would be combined with a liquid epoxy resin having an epoxy value of 200 in a weight ratio of 14 parts curing agent for every 110 parts of resin. Greater or lesser amounts of the curing agent would yield a polymer that was less completely coupled.

The useful amine coupling agents include both aliphatic and aromatic polyamines although the chemical resistance and strength at elevated temperatures of polymers cured with aromatic polyamines are significantly better than those obtained with the aliphatic polyamines, such as diethylene triamine. Amine salts, dicyandiamide and dihydrazides may be classified as latent curing agents. These materials decompose at elevated temperatures to yield products which are active in the coupling process and, for this reason, they are preferred in the present invention.

A variety of anhydrides are used in curing epoxy resins. In general, the anhydride-epoxy resin reaction is sluggish even at moderately elevated temperatures, and thermal cures are usually required. Anhydride coupling agents are also preferred in the present invention. In commercial practice, phthalic anhydride, dodecenylsuccinic anhydride, chlorendic anhydride and pyromellitic dianhydride are all used.

The (C) component of the thermoplastic compositions embodied herein include monomeric materials having a plurality of polymerizable $CH_2=C<$ groupings wherein the said groupings are separated from one another by at least one intervening atom, and such materials include allyl esters such as diallyl phthalate, diallyl isophthalate, diallyl terphthalate, diallyl adipate, diallyl succinate, triallyl citrate, diallyl maleate, diallyl itaconate, diallyl oxalate, diallyl glutarate, diallyl fumarate, dimethylallyl phthalate, dimethallyl adipate, allyl acrylate, allyl methacrylate, methylallyl acrylate, methallyl methacrylate; polyallyl ethers of polyhydric alcohols, such as diallyl ethylene glycol, trimethallyl glycerol, tetraallyl pentaerythritol, polyallyl sorbitol, polyallyl inositol, polyallyl raffinose, and the like; vinyl esters, such as divinyl fumarate, vinyl acrylate, vinyl methacrylate, isopropenyl acrylate; vinyl ethers of polyhydric alcohols including divinyl ethylene glycol diether, the divinyl ether of cyclohexane diol, trivinyl glycerol, tetravinyl pentaerythritol, polyvinyl ethers of sucrose, polyvinyl ethers of glucose, polyvinyl ethers of starch, and the like; acrylic esters of polyhydric alcohols, such as ethylene glycol diacrylate, ethylene glycol dimethacrylate, glycerol triacrylate, inositol hexaacrylate, pentaerythritol tetramethacrylate, polyacryalte esters of sucrose, glucose, raffinose, mannitol and the like; triallyl cyanurate, triacrylyl hexahydrotriazine, trimethacrylyl hexhydrotriazine, hexallyl trimethylene trisulfone, diallyl melamine, methylene-bis-acrylamide, methylene-bis-methacrylamide, N,N-diallyl acrylamide, N-allylacrylamide, N,N-diallyl methacrylamide, N-methallyl methacrylamide, triallyl phosphate, diallyl benzene phosphonate, diallyl propene-1-phosphonate, tetraallyl silane, tetraallyl tin, tetravinyl germane, diallyl divinyl silane, triallyl vinyl tin, allyl trivinyl germane, 1,5-hexadiene, 1,7-octadiene, 1,8-nonadiene, divinyl benzene, diisopropenyl benzene, trivinyl benzene, tetraalyl methane, tetramethallyl methane, tetravinyl methane and the like and others disclosed in U.S. Patents Nos. 3,050,496; 2,991,276; 2,978,421; 2,783,212; 2,712,004; 2,550,652; 2,475,846; 2,437,508; 2,341,334; 2,273,891 and Canadian Patent No. 651,654. The preferred component (C) are the allyl esters, acrylic esters of polyhydric alcohols and the allyl phosphates and phosphonates more fully described above.

The (D) component of the thermoplastic compositions embodied herein includes monomeric materials of relatively low volatility having a single polymerizable $>C=C<$ grouping, such materials include the higher acrylate esters such as the butyl acrylates, the amyl acrylates, the hexyl acrylates, cyclohexyl acrylate, phenyl acrylate, the heptyl acrylates, the octyl acrylates, the nonyl acrylates, the decyl acrylates, the dodecyl acrylates, the octadecyl acrylates, and the like; the butyl methacrylates, the amyl methacrylates, the hexyl methacrylates, the octyl methacrylates, the nonyl methacrylates, the decyl methacrylates, the dodecyl methacrylates, the octadecyl methacrylates and the like; the higher vinyl ethers such as vinyl butyl ether, the vinyl amyl ethers, the vinyl hexyl ethers, vinyl cyclohexyl ether, vinyl phenyl ether, the vinyl heptyl ethers, the vinyl octyl ethers, the vinyl decyl ethers, the vinyl octadecyl ethers, vinyl-2-butoxy ethyl ether, vinyl-2-octoxy ethyl ether, vinyl-3-butoxy-propyl ether, vinyl-4-ethoxy butyl ether, vinyl-3-butoxy-butyl ether, and the like; the higher vinyl esters such as vinyl butyrate, vinyl hexanoate, vinyl benzoate, vinyl 2-ethyl hexanoate, vinyl octanoate, vinyl laurate, and the like; higher allyl esters such as allyl butyrate, allyl hexanoate, allyl octanoate, allyl benzoate, allyl laurate, and the like; the higher fumarate esters such as the dibutyl fumarates, the diamyl fumarates, the dihexyl fumarates, the dioctyl fumarates, and the like; the higher maleate esters such as the dibutyl maleates, the dihexyl maleates, the dioctyl maleates, the dicyclohexyl maleates, and the like; the higher esters of itaconic acid such as the dibutyl itaconate, the dihexyl itaconates, the dioctyl itaconates, the dilauryl itaconates, and the like; the higher N-substituted acrylamides such as the N-butyl acrylamides, the N-amyl acrylamides, the N-hexyl acrylamides, the N-cyclohexyl acrylamide, N-phenyl acrylamide, the N-octyl acrylamides, the N-decyl acrylamides, the N-dodecyl acrylamides, N,N-diethyl acrylamide, N,N-dibutyl acrylamide, N,N-dioctyl acrylamide, N-methylol acrylamide, N-ethanol acrylamide, the N-propanol acrylamides, the butyl ethers of N-methylol acrylamide, and the like; the N-substituted methacrylamides such as the N-butyl methacrylamides, the N-amyl methacrylamides, the N-hexyl methacrylamides, N-cyclohexyl methacrylamide, N-phenyl methacrylamide, the N-octyl methacrylamides, the N-decyl methacrylamides, the N-dodecyl methacrylamides, N,N-diethyl methacrylamide, the N,N-dipropyl methacrylamides, the N,N-dibutyl methacrylamides, the N,N-dihexyl methacrylamides, N-methylol methacrylamide, N-ethanol methacrylamide, the N-butanol methacrylamides, the butyl ether of N-methylol methacrylamide, and the like; vinyl imides such as N-vinyl succinimide, N-vinyl phthalimide and the like; the higher vinyl ketones such as the vinyl butyl ketones, the vinyl amyl ketones, the vinyl hexyl ketones, the vinyl octyl ketones, and the like.

It is preferred that the thermoplastic compositions of this invention also include a polymerization catalyst or a free radical initiator and preferably one which generates free radicals only at higher temperatures.

Among the polymerization catalysts useful in the present invention are included inorganic super peroxides such as barium peroxide, sodium peroxide, ozone, etc.; symmetrical diacyl peroxides such as acetyl peroxide, lauroyl peroxide, benzoyl peroxide, succinyl peroxide, anisoyl peroxide, etc.; tertiary butyl perbenzoate, tertiary butyl hydroperoxide, furoyl peroxide, cumene hydroperoxide, toluyl hydroperoxide, benzoyl peroxide, cyclohexyl hydroperoxide, p-bromobenzoyl hydroperoxide, terpene peroxides such as pinane hydroperoxide and p-menthane hydroperoxide, peroxides of the drying oils such as those formed upon oxidation of linseed oils, etc.; various other per compounds such as perborates, perchlorates, ozonides, etc.; dialkyl peroxides such as ditertiary butyl peroxide, dicumyl peroxide, methyl ethyl ketone peroxide, and free radical producing agents such as 1,1,2,2-tetra-ethyl-1,2-diphenylethane, $\alpha$-methyl-$\alpha$-ethyl, $\beta$-methyl-$\beta$-ethyl-$\alpha,\beta$-diphenylethane, etc. The use of radiant energy such as nuclear radiation, X-rays, ultra violet and infrared radiation and the like for initiation of the cure is also within the scope of the present invention.

The (E) component of the thermoplastic composition embodied herein may be any fiber, natural or artificial, or combinations of natural and artificial. The term "fiber" as used herein includes naturally occurring materials such as cotton, flax, hemp, wool, hair and silk, and includes long, thin objects which besides their filiform shape possess considerable tensile strength, toughness, and flexibility. The term "fiber" also includes products of non-natural origin, such as viscose rayon and acetate rayon, nylon, Orlon, Vinyon, Saran, arolac, Ardil, Dacron, and Vicara. Some of these man-made fibers, for example, viscose rayon, and the various respun protein fibers, such as arolac (from casein), Ardil (from peanuts), and Vicara (from zein), are of a "half-synthetic" character.

There exist in nature also fibrous materials of inorganic character, such as asbestos and other silicates, and there are many inorganic substances which may be processed into fiber forms such as steel, aluminum, tungsten, molybdenum, carbon, aluminum silicate, graphite, rock wool, tantalum, quartz, and glass. The modulus of elasticity (Young's modulus) is an important quantity in characterizing a fiber, yarn or cord; it represents its stiffness by measuring the initial resistance against extension. Preferred in the instant invention are fibers having a modulus of elasticity of more than about $50 \times 10^5$ p.s.i. and more preferred are those fibers having a modulus of elasticity in excess of about $200 \times 10^5$ p.s.i. Such fibers include those of steel, quartz, glass, and the like. Fibers of glass are most preferred in the present invention.

The fibers useful herein are employed in a random manner preferably in the form of chopped roving or chopped strand and mat therefrom as distinguished from the continuous filament and woven forms of fiber. The size of the cross-section of the individual fibers useful herein is not critical, the only requirement being that they be in the fiber range. The fibers useful herein may also have coated surfaces for improvement of their physical and chemical properties. Chrome-finish or silane-finish glass fibers, for instance, are representative of coated fibers which are useful in the present invention.

The process for preparing the final cured reinforced plastic compositions embodied herein usually consist of three main steps. In the first step the vinyl halide resin, the thermosetting synthetic polymer, the polymerizable polyalkenyl monomer, the polymerizable monoalkenyl monomer and the fiber are mixed by suitable mixing means. It is sometimes preferred to blend one or all of the resinous and monomeric materials to get a mix of a desired viscosity and then to add the fibers to the resin-monomer mix. The stabilizers, activators and catalyst are also added to the mix; however, it is generally preferred to add the catalyst as the last ingredient. The mixing time becomes important in a blade type mixer wherein considerable shear takes place. Mixing in such a device should be limited to a few minutes duration in order to avoid the breaking and shearing of the fibers which might occur.

Secondly, the coherent mixture obtained from the first step can be sheeted out on a calender or similar device; or it may be pressed into sheets or other shaped articles at a temperature of from about 240–270° F.

In an alternative procedure to the first two steps given above, the various resin and fiber ingredients are mixed by air layering onto a screen or other porous base and the resulting loosely packed sheet is then compressed and partially fused in a suitable apparatus such as a Rotocure to form a thermoplastic structure.

In the third step the structure is formed and cured at a temperature of from 250 up to 400° F. and preferably at about 300° F. This step may be performed by the forming and partial curing of a structure in the mold followed by a post cure out of the mold in a suitable heating area such as in an oven.

In the following illustrative examples, the amounts of ingredients used are expressed as parts by weight unless otherwise indicated.

Example I (A) A mixture of 281 g. of a medium molecular weight general purpose vinyl chloride-vinyl acetate containing about 3% vinyl acetate (VYNW, Union Carbide Plastics Co.), 94 g. of a medium molecular weight vinyl chloride-vinyl acetate copolymer containing about 14% vinyl acetate (FCR, Diamond Alkali), 175 g. of an aluminum silicate filler (ASP-400, Minerals & Chemical Philipp Corp.), and 21 g. of a vinyl stabilizer compound of the dibasic lead salt of phosphorous acid (Dyphos, National Lead Co.) was blended in a Baker-Perkin mixer equipped with sigma blades. To the resulting dry mix was added a combination of 115 g. of N-t-octyl acrylamide (prepared by the reaction of alpha-diisobltylene and acrylonitrile in the presence of sulfuric acid) and 8 g. of dicumyl peroxide dissolved in a previously prepared solution of 230 g. of an unsaturated polyester in 115 g. of diallyl phthalate. The polyester was a solid at room temperature and was composed of phthalic acid, maleic acid and propylene glycol units. This polyester contained about 28% unsaturated units of the type

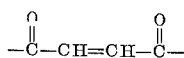

and is also known as CoRezyn-6, Commercial Resins Corp. During this mixing operation which lasted 20 minutes, the Baker-Perkin mixer was heated to 50–60° C. with steam. While mixing was continued and external heating was discontinued, sufficient Dry Ice was added to the plastic composition in the mixer to cool it and produce a somewhat hard, granular product. The granular product was then transferred in portions to a Waring Blendor in which it was ground to a more uniform, finely divided solid.

A portion of the above-prepared resin mixture (910 grams) was sifted and dispersed evenly between 8 layers (about 10″ x 48″ each) of randomly dispersed 2 inch length chopped strand glass mat (607 grams total, density of ¾ ounce per square foot). This resulting composite contained 40% by weight of glass reinforcement based on the total weight of glass fiber plus resin plus filler. This composite structure was next faced on the outside surfaces with cellophane film and was then fed through a Rotocure apparatus. The Rotocure apparatus was operated at 260° F. and at a hydraulic pressure of 150 p.s.i. Residence time for the sheet in the apparatus was 1¼ minutes. The purpose of this operation was to compact the glass-resin mixture and to partially fuse the organic components in the mixture. The resulting sheet (called mill product) was an integral, strong, flexible sheet. It was apparent that substantially no cross-linking or thermosetting reaction had occurred in the sheet at this point.

The foregoing technique was used to make many flexible, reinforced thermoplastic sheets from various combinations of resins, fillers fibers, catalysts and stabilizers. The various combinations were made for studying the many formulation variables. Effects on processing and on physical and mechanical properties both before and after cure were measured.

(B) One method for curing the sheet prepared as in (A) above is as follows:

(1) Flat sheets for the convenience of testing mechanical properties were cured in a 4″ x 6″ frame made from ¼″ aluminum and attached with screws to a solid aluminum sheet (¼″ thick). An aluminum insert (also 4″ x 6″ x ¼″) was placed on top of the sample to be cured so that a known uniform pressure was exerted on the sample. A hydraulic press having electrically heated platens (9½″ x 12½″) and a total ram pressure of 40,000 pounds was used in curing flat samples. Typical properties of the cured flat samples are given in Table I. These samples were cured by placing the unheated aluminum mold containing the sample into the press which was set at the designated cure temperature. The pressure maintained during the cure was applied immediately without any allowance for "warm-up period." After being cured for the specified time, the mold containing the sample was removed from the heated press and usually was allowed to cool slightly before the cured sample was removed; this cooling period in most instances is not necessary.

(2) Shaped or molded articles were prepared from the product of (A). Molding conditions of from 3–6 minutes in the mold at from 200–300 p.s.i. and at 300°–320° F. gave good results. Fast closing of the mold appears to greatly reduce the tendency for the surface of the sample to tear. Articles of complicated shapes and differing degrees of draw were prepared from the flat sheet described in (A). Articles of this nature were prepared with and without unreinforced surface skins on the sample. Molded articles having draw ratios as high as 50% were prepared. Excellent molded samples were prepared by compression molding in a commercial matched metal die mold which had some sharp radii (about ⅛″ radius). A 150 ton press with steam heated platens was used with the commercial matched metal die mold. Portions of samples molded and cured in this manner were cut from along the flat areas and subjected to testing with the following results:

|  | Cure Conditions | |
| --- | --- | --- |
|  | 4 min. at 300° F., 270 p.s.i. | 6 min. at 320° F., 247 p.s.i. |
| Flexural modulus×10⁵ p.s.i., 80° C | 4.36 | 6.84 |
| Flexural strength×10³ p.s.i., 80° C | 7.96 | 13.6 |

TABLE I
[Physical properties of cured mill product prepared by procedure (B)(1) of Example I]

|  | Cure Conditions, Temp. °F., Pressure p.s.i., 15 min. | |
| --- | --- | --- |
|  | 320° F., 200 p.s.i. | 320° F., 400 p.s.i. |
| Flexural Modulus×10⁵ p.s.i., 80° C | 6.88 | 8.46 |
| Flexural Strength×10³ p.s.i., 80° C | 14.5 | 18.0 |
| Flexural Strength×10³ p.s.i., 25° C | 31.5 | 36.1 |
| Flexural Modulus×10⁵ p.s.i., 25° C | 18.0 | 19.5 |
| Tensile Modulus×10⁵ p.s.i., 80° C | 3.50 | 3.55 |
| Tensile Strength×10³ p.s.i., 80° C | 13.5 | 13.4 |
| Tensile Modulus×10⁵ p.s.i., 25° C | 5.45 | 5.27 |
| Tensile Strength×10³ p.s.i., 25° C | 15.9 | 14.9 |
| Heat Distortion Temp., °C | >184 | >187 |
| Izod Impact (ft./lb.) | 8.6 | 12.3 |

Example II (A) A non-reinforced thermoplastic-thermosetting composition useful inter alia for putting surface skins on the compositions described in Example I was prepared in the following manner.

The following materials were mixed on a roller mill having rolls heated to 260–270° F.:

|  | Parts |
| --- | --- |
| VYNW | 42.3 |
| Acryloid K-120-N (polymethyl methacrylate, Rohm & Haas) | 7.7 |
| CoRezyn-6 | 16.67 |
| Diallyl phthalate | 16.67 |
| t-Octyl acrylamide | 16.67 |
| Aluminum silicate filler | 5.67 |

Plasticization of the mixture occurred in about one minute or less on the mill. The roll temperature was then lowered to 220° F. and the catalyst (1 part dicumyl peroxide) was then mixed in. In two to three minutes mixing was completed and the sheet was removed at a thickness of 0.010 to 0.025 inch.

The foregoing sheet can be laminated or fused to the mill product described in Example I during the Rotocure cycle or as a part of the preheating step which may precede the molding operation. When this surface sheet or skin is applied during the Rotocuring operation the conditions need not be altered greatly from those used normally with the unsurfaced mill product described in Example I.

When this unreinforced skin is applied to a surface in a press as part of a preheating operation, it is usually preferred to warm the skin at about 270° F. in the press for 10–15 seconds before the pressure is applied. Pressures in the order of about 200 p.s.i. have been found to be adequate.

Molding conditions of 3–6 minutes, 200 p.s.i. and 300–320° F. are preferred. Fast closing rates of the mold are highly desirable. Articles were successfully molded from mill product having surface skins in compression molds requiring draw ratios as high as 50%. Good samples of molded articles were obtained from a moderately complex commercial mold which contained sharp radii of about ⅛". A 150 ton press with steam heated platens was used for compression molding of these articles.

In the foregoing recipe the weight ratio of the thermoset-to-thermoplastic components was varied in the range from 60–40 to 40–60. Other vinyl chloride resins were employed with similar results. Vinyl stabilizers may be included in the recipe although excellent results have been obtained with no stabilizers.

(B) Samples of (1) a conventional glass fiber reinforced polyester cured composition which is outside the scope of the present invention (control), (2) a cured, reinforced composition according to Example I(A) and (3) a cured, reinforced composition having on both sides a non-reinforced surface skin according to Example II(A) were prepared and tested for water absorption. The water absorption tests were based on ASTM D 570-59 AT with one difference—samples were molded in a two inch square mold instead of a two inch disk mold.

(1) The resin portion of the composition was composed of the following:

| | Parts |
|---|---|
| CoRezyn-2 [1] | 43 |
| Styrene monomer | 28 |
| Aluminum silicate filler | 29 |
| Benzoyl peroxide | 0.8 |

[1] A solid polyester resin prepared by the esterification-condensation of propylene oxide with isophthalic acid and maleic acid. This resin contains about 18% by weight of the

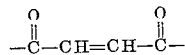

grouping.

A sufficient amount of the above mixture was spread on two inch squares of glass mat composed of randomly dispersed glass fibers 2" in length (Owens Corning M 700) to make the final glass content 40% by weight. The resulting squares were placed into a mold which had been preheated to 235° F. and were cured for 5 minutes. During the last three minutes of the cure cycle 500 p.s.i. was applied to the structure. There was some flashing on the edges of the sample which was removed by sanding the edges lightly. The average thickness of the cured reinforced product was 0.125 inch ±0.005 inch.

(2) A square reinforced thermoset structure was prepared using a resin component of:

| | Parts |
|---|---|
| 2/1 by weight ratio of VYNW/FCR | 45 |
| 2/1/1 CoRezyn-1[1]/t-octyl acrylamide/diallyl phthalate | 55 |

[1] CoRezyn-1 is similar to Co-Rezyn-6 except that it contains about 24% by weight of the

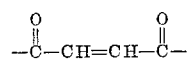

grouping.

| | Parts |
|---|---|
| Epoxol [2] 9-5 | 1 |
| Ferro 6V6A (non-soapy vinyl stabilizer containing 4.5% Ba, 2.5% Cd, and 1% Zn) | 1 |
| Dicumyl peroxide | 1 |
| Filler | -- |

[2] An epoxidized vegetable oil containing a minimum of 9% oxirane oxygen and an average of more than 5 epoxide groups per molecule, Swift & Company.

The foregoing resin mixture was spread on sufficient glass mat as in (1) above to make a final composition having a final glass content of 40% by weight. The resulting composite was fused in a two inch square as described in (1) above. The average thickness of these samples was 0.095±0.003 inch.

(3) Several 2 inch squares of uncured composite as described in (2) above were covered with a skin on both faces approximately 0.015 inch thick before being cured in the mold. The skin was prepared by milling the following mixture as more fully described in Example II(A):

| | Parts |
|---|---|
| VYNW | 66⅔ |
| 3/3/2 by weight ratio of CoRezyn-6/diallyl phthalate/t-octyl acrylamide | 33⅓ |
| Epoxol 9-5 | 3 |
| Ferro 1237 [1] | 1 |
| Dicumyl peroxide | 0.4 |

[1] A liquid vinyl stabilizer containing Ba, Cd and Zn, Ferro Chemical Corp.

Light sanding of the edges was also required to remove flashing from these samples after they were removed from the curing molds. The average thickness of the samples with skins was 0.130±0.005 inch.

The cured samples (1), (2) and (3) were conditioned in a 105° C. oven for one hour. They were then immersed in deionized water. Weightings were made before and after conditioning, after 24 hours, after one and two weeks and after each succeeding two weeks. The results of the water-absorption tests, expressed as percent in weight, are shown in Table II.

TABLE II

| | Sample | | |
|---|---|---|---|
| | (1) | (2) | (3) |
| Time of immersion: | Percent | Percent | Percent |
| 24 hours | 0.22 | 0.15 | 0.11 |
| 1 week | 0.50 | 0.37 | 0.26 |
| 2 weeks | 0.68 | 0.48 | 0.33 |
| 4 weeks | 0.79 | 0.59 | 0.41 |
| 6 weeks | 0.86 | 0.68 | 0.48 |

It is apparent from Table II that the control sample (1) gained 20–30% more weight than the composition of this invention without surface skin (2) and 40–50% more weight than the compositions of this invention having the surface skin embodied in this invention (3). It is also apparent that the compositions of this invention having no skin (2) gained about 30% more weight than those having a skin (3).

*Example III*

This example demonstrates the cure rate advantage of the compositions of the instant invention when compared with the cure rates for the compositions embodied in copending U.S. patent application Serial No. 267,813.

A Leeds and Northrup Speedomax, Type G, recorder was used to record the changes in temperature vs. time of samples as detected by a thermocouple. A frame was employed to hold the thermocouple (iron-constantan) tip in the center of the sample to be tested. The frame was made of ¼ inch aluminum plate and had a one inch wide border forming a two inch square center hole. Centered in one side was a ⅛ inch O.D. steel tube through which the thermocouple was centered in the cavity and the tube compressed to hold the wire in place. An electrically heated Pasadena Hydraulic press with automatic temperature control was used. The variation of the press temperature in the 300° F. range was ±5° F.

The mixture, usually a semi-dry powder, was pressed into sheet form in a 200° F. press under 200 p.s.i. for four minutes. Spacers were used to give a 3/16 inch thick sheet. The reinforced sheets were usually about 1/8 inch thick.

The pressed sheets were next cut into two inch squares. A square was placed on each side of the thermocouple tip. If the pressed sheet was rigid a small indentation was made for the tube. The sample with frame (sandwiched between cellophane and a ferrotype) was placed in the press and 500 pounds pressure was applied immediately. The starting daylight in the press was one inch and the point at which first pressure was applied to the sample was recorded. In calculating time to peak exotherm, the time was measured from the point the press closed on the sample to the intersection of tangents drawn on each side of the asymmetrical peak of a plot of time vs. temperature.

(A) The compositions used in the exotherm tests were mixtures of the following ingredients:

| | Parts |
|---|---|
| 3/1 VYNW/FCR | 50 |
| CoRezyn-1 | 25 |
| Diallyl phthalate | 12.5 |
| Monoalkenyl monomer | 12.5 |
| Epoxol 9-5 | 3 |
| Ferro 1237 | 1 |
| Dicumyl peroxide | 1 |

The press temperature was maintained at 300° F.±5° F. The results of the tests are given in Table III.

TABLE III

| Monomer | Peak exotherm, ° F. | Time to peak |
|---|---|---|
| Diallyl phthalate (control) | 364 | 5 min., 9 sec. |
| t-Octyl acrylamide | 359 | 3 min., 48 sec. |
| 2-ethylhexyl acrylate | 380 | 4 min., 16 sec. |
| Vinyl 2-ethylhexoate | 370 | 4 min., 31 sec. |
| Vinyl 2-butoxyethyl ether | 369 | 3 min., 19 sec. |
| N-vinyl phthalimide | 413 | 3 min., 31 sec. |
| N-vinyl succinimide | 436 | 2 min., 51 sec. |

(B) The procedure of (A) of this example was repeated except that the monomer used was t-octyl acrylamide throughout and the ratio of t-octyl acrylamide to diallyl phthalate was varied as shown in Table IV. The recipe employed was:

| 3/1 VYNW/FCR | parts | 200 |
|---|---|---|
| CoRezyn-1 | | 100 |
| t-Octyl acrylamide | | Variable |
| Diallyl phthalate | | Variable |
| Epoxol 9-5 | phr | 3 |
| Ferro 1237 | phr | 1 |
| Dicumyl peroxide | phr | 1 |

TABLE IV

| Parts t-Octyl acrylamide | Parts diallyl phthalate | Peak exotherm, ° F. | Time to peak |
|---|---|---|---|
| 0 | 100 | 357 | 5 min., 7 sec. |
| 25 | 75 | 360 | 4 min., 24 sec. |
| 50 | 50 | 365 | 3 min., 44 sec. |
| 75 | 25 | 361 | 3 min., 31 sec. |
| 100 | 100 | 406 | 3 min., 21 sec. |
| 75 | 75 | 384 | 3 min., 35 sec. |

Shorter times to peak than any of those shown in Table IV were obtained when 100 parts of t-octyl acrylamide and no diallyl phthalate were employed in the recipe.

*Example IV*

A series of unreinforced cured sheets were prepared from the following recipe:

| 3/1 VYNW/FCR | parts | 200 |
|---|---|---|
| CoRezyn-6 | | Variable |
| t-Octyl acrylamide | | Variable |
| Diallyl phthalate | | Variable |
| Epoxol 9-5 | phr | 3 |
| Ferro 1237 | phr | 1 |
| Dicumyl peroxide | phr | 1 |

The results are given in Table V.

TABLE V

| Parts CoRezyn-6 | Parts t-octyl acrylamide | Parts diallyl phthalate | 80° C. Flex | | 25° C. Flex | |
|---|---|---|---|---|---|---|
| | | | Strength ×10³ | Modulus ×10⁵ | Strength ×10³ | Modulus ×10⁵ |
| 125 | 75 | 0 | 0.18 | 0.0179 | 6.42 | 4.17 |
| 133 | 40 | 27 | 0.189 | 0.0318 | 6.74 | 4.87 |

*Example V*

(A) The physical properties were determined for cured reinforced materials prepared from the recipe having the resin components:

| | Parts |
|---|---|
| 3/1 VYNW/FCR | 50 |
| CoRezyn-1 | 25 |
| Diallyl phthalate | 12.5 |
| Monomer | 12.5 |
| Epoxol 9-5 | 3 |
| Ferro 1237 | 1 |
| Dicumyl peroxide | 1 |

The final material was composed of an intimate mixture of 40% by weight of randomly dispersed glass fiber and 60% of the resin component. The reinforced structures were cured at 300° F., 200 p.s.i. for 30 minutes each. The resulting cured articles had the properties listed in Table VI.

TABLE VI

| Monomer | Flex Strength (80° C.)×10³ | Flex Modulus (80° C.)×10⁵ |
|---|---|---|
| 2-ethyl hexyl acrylate | 3.17 | 1.67 |
| Dibutyl itaconate | 2.09 | 0.95 |
| Vinyl 2-butoxyethyl ether | 2.12 | 0.82 |
| N-vinyl phthalimide | 8.16 | 5.53 |
| N-vinyl succinimide | 8.25 | 5.42 |
| t-Octyl acrylamide [1] | 4.43 | 2.08 |

[1] 35% glass mate.

(B) The procedure of (A) of this example was repeated using varying ratios of t-octyl acrylamide and diallyl phthalate in the resin recipe. The recipe used was:

| 3/1 VYNW/FCR | parts | 200 |
|---|---|---|
| CoRezyn-1 | | 100 |
| t-Octyl acrylamide | | Variable |
| Diallyl phthalate | | Variable |
| Epoxol 9-5 | phr | 3 |
| Ferro 1237 | phr | 1 |
| Dicumyl peroxide | phr | 1 |

Intimately mixed samples containing 65% by weight of the resin component of the recipe above and 35% by weight of randomly dispersed glass fibers were formed into sheets and cured at 300° F. and 200 p.s.i. for 30 minutes. The cured samples were found to have the properties given in Table VII.

TABLE VII

| Parts t-octyl acrylamide | Parts diallyl phthalate | 80° C. Flex | | 25° C. Flex | |
|---|---|---|---|---|---|
| | | Strength ×10³ | Modulus ×10⁵ | Strength ×10³ | Modulus ×10⁵ |
| 0 | 100 | 4.01 | 2.53 | 30.5 | 15.6 |
| 25 | 75 | 4.44 | 2.56 | 25.4 | 14.8 |
| 50 | 50 | 4.43 | 2.08 | 25.1 | 15.1 |
| 75 | 25 | 3.40 | 1.75 | 25.4 | 14.7 |
| 100 | 0 | 2.78 | 1.11 | 22.0 | 12.8 |
| 100 | 100 | 4.63 | 2.84 | 27.6 | 14.8 |
| 75 | 75 | 5.77 | 2.47 | 23.1 | 13.0 |

*Example VI*

As described in Example III, exotherms were determined in the cure of reinforced compositions of this invention. The resin recipe was the following:

| | Parts |
|---|---|
| 3/1 VYNW/FCR | 50 |
| CoRezyn-1 | 25 |
| Diallyl phthalate | 12.5 |
| Monomer | 12.5 |
| Epoxol 9-5 | 3 |
| Ferro 1237 | 1 |
| Dicumyl peroxide | 1 |

The samples for exotherm determination contained 40% by weight of randomly dispersed glass fiber and 60% by weight of the resin of the above recipe. The exotherm data are given in Table VIII.

TABLE VIII

| Monomer | Peak Exotherm, °F. | Time to Peak |
|---|---|---|
| 2-ethylhexyl acrylate | 345 | 3 min. 36 sec. |
| Vinyl 2-butoxyethyl ether | 334 | 2 min. 45 sec. |
| N-vinyl phthalimide | 359 | 2 min. 47 sec. |
| N-vinyl succinimide | 380 | 2 min. 37 sec. |
| t-Octyl acrylamide | 342 | 3 min. 12 sec. |

*Example VII*

This example illustrates the preparation of a molding compound which is useful in premix type of molding operations to prepare molded products which are reinforced and thermoset.

(A) The mixing was carried out as follows: A Baker-Perkins mixer equipped with sigma blades was preheated to 100° C. by means of steam heat and to the preheated mixer was added a mixture of 200 parts of a vinyl chloride homopolymer of high molecular weight (QYNV, Union Carbide Plastics Co.), 150 parts of a monomer-free thermosetting polyester and 75 parts of t-octyl acrylamide. Mixing was continued for about ten minutes or until a uniform mixture was obtained. The steam heat was then turned off and a mixture of 75 parts of diallyl phthalate and 6 parts of dicumyl peroxide was added to the mixer slowly over a period of about a minute in order to get uniform mixing and good shearing action. After this organic portion was completely mixed, there was added 150 parts of aluminum silicate, 14 parts of Sb₂O₃, and 20 parts of zinc stearate. The resulting mass was mixed thoroughly for an additional two minutes and finally 350 parts of chopped glass fibers ¼" in length (OCF-805) were added slowly and evenly to the mixer in order to secure uniform distribution and minimum wetting-out time (about 1 minute). The fiber addition time should be held to an absolute minimum because excess shearing action of the blades in the mixer will cause degradation of the bundles of fibers, after the mixing is complete.

(B) The mix from (A) of this example was molded as follows: The mix was molded at 300° F. or higher at a pressure of about 1000 p.s.i. The optimum cure time at 340° F. was about 1½ minutes. When placing the mix in the press the following procedure was followed: A preformed slug of 180 grams was placed in the center of a 7" x 7" x ⅛" picture frame mold. The press was then closed to the maximum pressure and cured for a specified time. After the cure was completed, the polymerized panel was removed hot from the mold and placed under a weight to cool. The physical properties of the cured product are given in Table IX.

TABLE IX

| | |
|---|---|
| Flexural strength (25° C.) _____p.s.i__ | 18.8×10³ |
| Flexural modulus (25° C.) | 16.2×10⁵ |
| Flexural strength (180° F.) | 11.8×10³ |
| Flexural modulus (180° F.) | 6.8×10⁵ |
| Tensile strength (25° C.) | 7.1×10³ |
| Tensile modulus (25° C.) | 7.4×10⁵ |
| Tensile strength (180° F.) | 4.9×10³ |
| Tensile modulus (180° F.) | 3.4×10⁵ |
| Heat distortion temp., °C. | >173 |
| Notched Izod impact _____ft./lb__ | 4.7 |
| Barcol hardness | 55 |
| Shore "D" hardness | 90 |

It is to be understood that numerous other shaped articles of various sizes and configuration can be made from the compositions embodied herein and that other ingredients than those specifically disclosed in the foregoing examples may be employed in the molding compositions by those skilled in the art without departing from the scope of this invention which is more fully defined in the accompanying claims.

We claim:
1. The composition comprising a major portion of an intimate, cohesive mixture of components
 (A) a thermoplastic vinyl halide resin
 (B) a thermosetting synthetic polymer selected from the group consisting of epoxy resins and alkyd resins
 (C) a polymerizable polyalkenyl monomer
 (D) an N-alkyl amide of acrylamide wherein the alkyl group contains from 4 to 18 carbon atoms and
 (E) randomly dispersed reinforcing fibers
wherein there is present from about 7 to 70 parts by weight of component (A) and from about 93 to 30 parts by weight of components (B), (C) and (D) per 100 parts of the sum of $(A)+(B)+(C)+(D)$, from 30 to 70 parts by weight of component (B), from 0 to 40 parts by weight of component (C) and from 10 to 70 parts by weight of component (D) per 100 parts by weight of $(B)+(C)+(D)$, and from 0 to 50 parts by weight of component (E) per 100 parts by weight of components $(A)+(B)+(C)+(D)+(E)$.

2. The composition of claim 1 wherein component (A) is a polyvinyl chloride resin.

3. The composition of claim 2 wherein component (C) is a monomer having a plurality of $CH_2{=}C{<}$ groupings wherein the said groupings are separated from one another by at least one intervening atom.

4. The composition of claim 3 wherein the component (E) is a glass fiber.

5. The composition of claim 4 wherein component (A) is a vinyl chloride, vinyl acetate copolymer.

6. The composition of claim 5 wherein component (B) is an unsaturated, polymerizable alkyd resin.

7. The composition of claim 6 wherein the component (C) is diallyl phthalate.

8. The composition of claim 7 wherein the component (E) is chopped glass roving.

9. The composition of claim 8 wherein the component (D) is N-t-octyl acrylamide.

10. A flexible, heat curable structure comprising a major proportion of a strong, flexible compressed mass of an intimate mixture of components
 (A) a thermoplastic vinyl halide resin
 (B) a thermosetting synthetic polymer selected from the group consisting of epoxy resins and alkyd resins
 (C) a polymerizable polyalkenyl monomer
 (D) an N-alkyl amide of acrylamide wherein the alkyl group contains 4 to 18 carbon atoms and
 (E) randomly dispersed reinforcing fibers wherein there is present from about 7 to 70 parts by weight of component (A) and from about 93 to 30 parts by weight of components (B), (C) and (D) per 100 parts by weight of the sum of $(A)+(B)+(C)+(D)$, from 30 to 70 parts by weight of component (B), from 0 to 40 parts by weight of component (C) and from 10 to 70 parts by weight of component (D) per 100 parts by weight of the sum of $(B)+(C)+(D)$, and from 0 to 50 parts by weight of component (E) per 100 parts by weight of components $(A)+(B)+(C)+(D)+(E)$.

11. The structure of claim 10 wherein component (A) is a polyvinyl chloride resin.

12. The structure of claim 11 wherein component (C) is a monomer having a plurality of $CH_2=C<$ groupings wherein the said groupings are separated from one another by at least one intervening atom.

13. The structure of claim 12 wherein component (E) is a glass fiber.

14. A flexible, heat curable composition comprising a major proportion of an intimate mixture of components
 (A) a thermoplastic vinyl halide resin
 (B) a thermosetting synthetic polymer selected from the group consisting of epoxy resins and alkyd resins
 (C) a polymerizable polyalkenyl monomer and
 (D) an N-alkyl amide of acrylamide wherein the alkyl group contains from 4 to 18 carbon atoms wherein there is present from about 7 to 70 parts by weight of component (A) and from about 93 to 30 parts by weight of components (B), (C) and (D) per 100 parts by weight of the sum of $(A)+(B)+(C)+(D)$, from 30 to 70 parts by weight of component (B), from 0 to 40 parts by weight of component (C) and from 10 to 70 parts by weight of component (D) per 100 parts by weight of the sum of $(B)+(C)+(D)$.

15. The cured structure of claim 10.

16. The cured composition of claim 14.

References Cited by the Examiner

UNITED STATES PATENTS

| | | | |
|---|---|---|---|
| 2,567,719 | 9/1951 | Loritsch et al. | 260—862 |
| 2,815,309 | 12/1957 | Ganahl et al. | 260—37 |
| 2,965,586 | 12/1960 | Fisch et al. | 260—836 |
| 3,133,825 | 5/1964 | Rubens | 260—884 |
| 3,157,713 | 11/1964 | Leese | 260—884 |
| 3,247,289 | 4/1966 | Sears | 260—884 |

FOREIGN PATENTS 540,383  10/1941  Great Britain.

MORRIS LIEBMAN, *Primary Examiner.*

L. T. JACOBS, *Assistant Examiner.*